No. 676,757. Patented June 18, 1901.
C. P. C. MINER.
ANIMAL TRAP.
(Application filed Mar. 25, 1901.)
(No Model.)
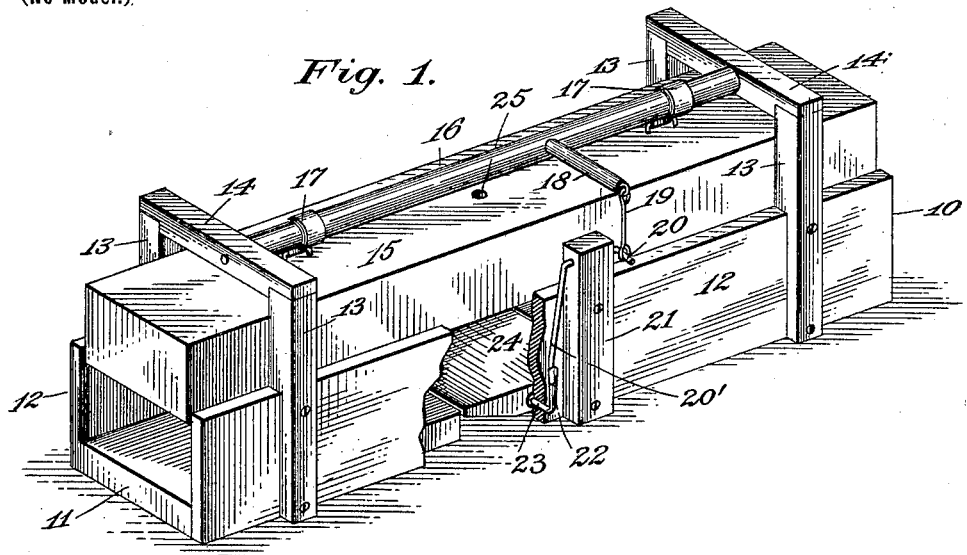
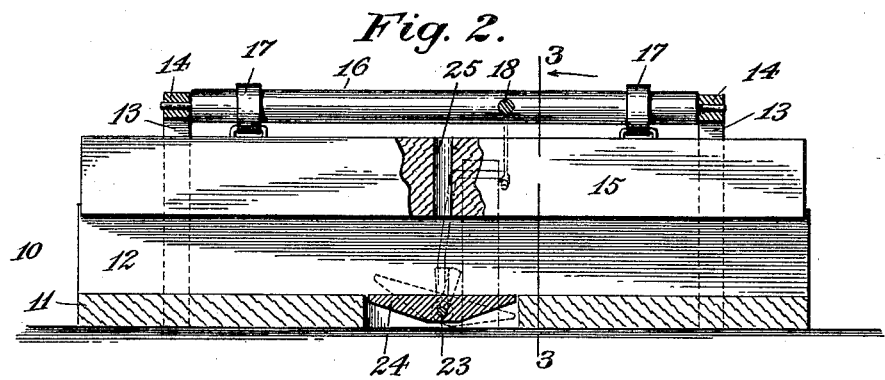
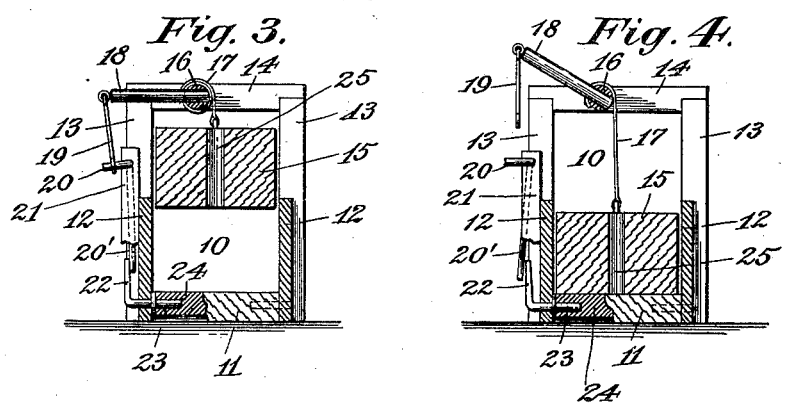
Witnesses
Chas. P. Schmelz
M. A. Campbell
Inventor
C. P. C. Miner,
By his Attorney

UNITED STATES PATENT OFFICE.

CHARLES P. C. MINER, OF CHARLEMONT, MASSACHUSETTS.

ANIMAL-TRAP.

SPECIFICATION forming part of Letters Patent No. 676,757, dated June 18, 1901.

Application filed March 25, 1901. Serial No. 52,801. (No model.)

*To all whom it may concern:*

Be it known that I, CHARLES P. C. MINER, a citizen of the United States of America, and a resident of Charlemont, in the county of Franklin and State of Massachusetts, have invented certain new and useful Improvements in Animal-Traps, of which the following is a full, clear, and exact description.

This invention relates to animal-traps; and it has for one of its objects the provision of a portable and self-contained device in which an animal after it has proceeded within said trap for a certain distance will be killed outright. To this end a trap made in accordance with my invention comprises as one of its features a runway which the animal is obliged to traverse in order to reach the bait and, in connection with said runway, a drop-weight mounted for vertical movement therein, said weight being normally raised when the trap is set.

My invention has furthermore for its object the provision within said runway of a movable device whereby the weight may be released as soon as an animal comes in contact therewith sufficiently to change its normal position, this device being preferably operated by the weight of the animal stepping upon it.

My invention includes as one of its features a tiltable platform in proximity to the bait and operable at a point remote from the entrance-opening of the runway, said platform being adapted for normally engaging a mechanism whereby the drop-weight will be normally sustained in elevated position.

My invention consists in the construction and organization of the several component parts, as will be hereinafter described, and set forth in the claim.

In the accompanying drawings, in which similar characters denote similar parts, Figure 1 is a perspective view of my improved trap. Fig. 2 shows a longitudinal section thereof. Fig. 3 is a cross-section taken on line 3 3 of Fig. 2, and Fig. 4 shows a similar section illustrating the parts in position after the trap has been sprung.

One of the particular aims of my present invention is the provision of an animal-trap whereby ready access may be afforded to the animals and in such a manner that they must travel along in the trap for some distance before reaching a movable member the displacement of which will cause a release of the drop-weight, so that the animal will be crushed and therefore instantly killed thereby, while at the same time the animals killed will be practically hidden from view, and therefore will not tend to frighten away others.

In the drawings, 10 denotes the frame of my improved trap, made substantially in the form of a runway and comprising a baseboard 11 and a pair of oppositely-disposed side walls 12, so that the ends and the top of the runway are open.

Secured to the sides 12 are posts 13, each pair of which are united at their tops and support a cross-piece 14, adapted for the reception of suitable means whereby a drop-weight, such as 15, may be raised, these means consisting in the preferred form thereof shown of a roller 16, rotatably supported between said cross-pieces 14 and connected with said weight by flexible bands 17, the ends of which may be secured to the said roller and weight, respectively, in any suitable manner.

Means are provided whereby the roller 16 after having been rotated to raise the weight may be locked or retained against backward movement—as, for instance, by an arm 18, carried by said roller 16 and having at its free end a link 19, the other end of which may be engaged by a mechanism which is operated to release the link, and therefore the roller, by an animal having traversed the runway to the required extent. This device consists substantially of a detent 20, pivotally supported in a post 21 and retained in operative position by a tripping member, such as 22, formed, preferably, integral with a pin 23, which serves as one of a pair of trunnions for pivotally supporting a member adapted to be displaced by an animal traversing the runway. This member is herein shown as a tiltable platform 24, adapted to be depressed on either end and pivoted in the sides 12 in any suitable manner—as, for instance, by the pins 23, above referred to—so that an animal approaching and stepping upon either end of the platform will cause the latter to be tilted, and thus release the detent 20.

Inasmuch as the runway is made of such length as to dispose the platform sufficiently remote from the entrance-opening thereof, it is somewhat difficult properly to place the bait relatively to said platform, and while it is entirely immaterial what kind of bait is employed I provide in the weight 15 an aperture 25, through which the bait may be dropped onto the platform or suspended, as the case may be.

The operation of my improved trap is extremely simple and substantially as follows: The weight 15 being in its lowermost position, the roller 16 is rotated to wind up the bands 17, and thus raise said weight to the required height, when the lower end of the link 19 may be placed on the detent 20, which in its turn may be retained in proper position by having the lower end of its arm 20' placed behind the tripping member 22, which is somewhat flattened in order to prevent the arm 20' from slipping out of contact therewith inadvertently. The tripping member is practically a fixture relatively with and on the platform 24, the upper surface of which will be in alinement with the top of the base-board 11 when the tripping member is in proper engagement with the arm 20'. The trap is now "set," and an animal after traversing the runway to reach the bait must of necessity step upon one end of the platform, thereby tilting the same sufficiently to release the detent mechanism 20, which in turn liberates the roller 16 and the weight 15 suspended thereby, the action being so quick that the animal even when running through the runway rapidly will yet be caught by the descending weight, and consequently killed thereby.

It is obvious that many of the details of my improved trap may be varied to a great extent without departing from the spirit of my invention, especially referring to the detent and weight-raising devices, and it should be understood that I do not confine myself to the particular form or organization thereof shown and described.

Having thus described my invention, what I claim, and desire to secure by Letters Patent, is—

The combination, with a runway open at its end; of a drop-weight mounted for vertical movement in said runway; a roller for raising said weight; and having an arm; a detent for normally retaining said roller against backward rotation, a tiltable platform disposed within said runway; and a tripping member carried by said platform, and for normally retaining said detent in operative position; and a link connected with the said arm and having a sliding engagement with said detent.

Signed by me at Charlemont, Massachusetts, this 14th day of March, 1901.

CHARLES P. C. MINER.

Witnesses:
GEORGE E. BEMIS,
OSCAR C. AVERY.